Patented June 12, 1951

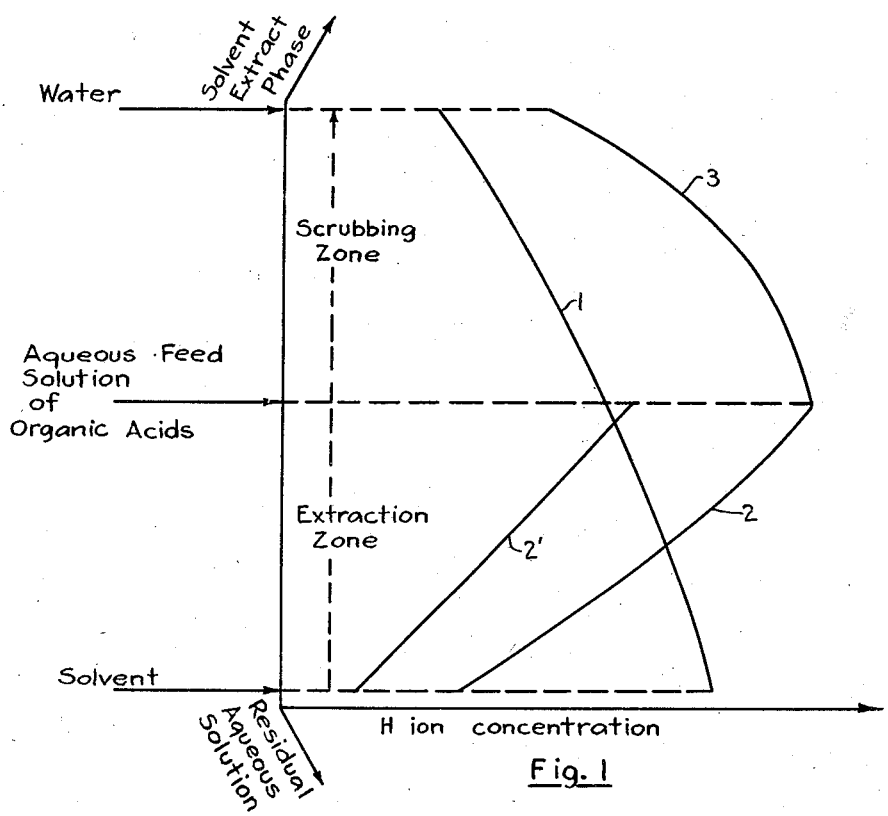
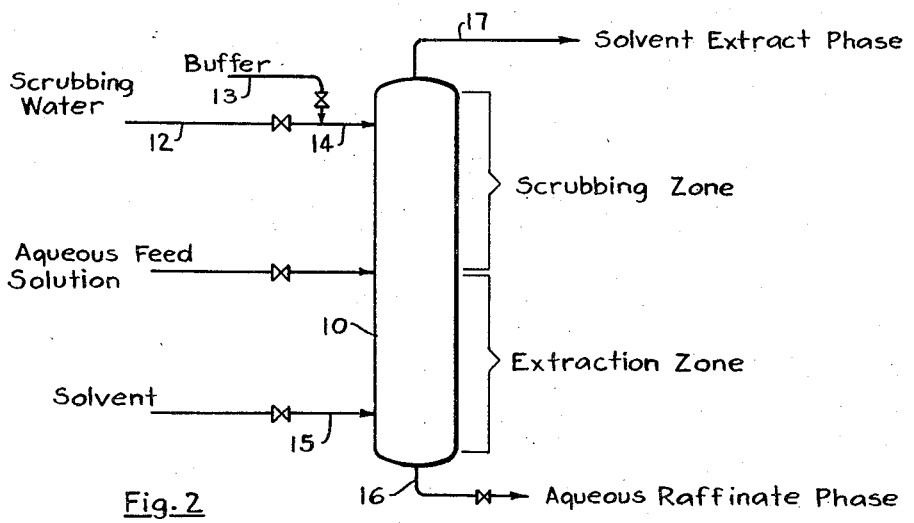

2,556,228

UNITED STATES PATENT OFFICE 2,556,228

SOLVENT EXTRACTION FOR THE SEPARATION OF ELECTROLYTES

Mott Souders, Jr., Piedmont, Calif., assignor to Shell Development Company, San Francisco, Calif., a corporation of Delaware Application July 26, 1949, Serial No. 106,795

16 Claims. (Cl. 260—239.1)

This invention relates to the separation of mixtures of organic electrolytes having a tendency to change their number of protons in the same direction when dissolved in water, but having different dissociation constants, i. e., mixtures containing several organic acids or several organic bases of different dissociation constants. Such substances are, for convenience, herein referred to as non-neutral organic electrolytes. The invention deals particularly with a solvent extraction method which permits a fractionation of such mixtures according to the strengths of such non-neutral electrolytes.

Mixtures of various organic acids or organic bases of different strengths are frequently obtained in various industries, often in aqueous solutions, and it is frequently desired to separate from them one or several particular components. Frequently the solubilities of these components in various solvents are of similar magnitudes, and as a result they are difficult to separate by solvents. Examples of such mixtures are lower fatty acids or chlorinated fatty acids, acids resulting from certain fermentation processes, particularly those obtained in the manufacture of penicillin, fruit and vegetable juices containing various acids, bases obtained in the ammonolysis of chlorinated hydrocarbons having, say, up to 5 or 6 carbon atoms, amino acids obtained from proteins, certain alkaloids, etc. Such mixtures may contain two or more acidic or basic components, and often are exceedingly complex.

It is a purpose of this invention to separate mixtures of water-soluble non-neutral organic electrolytes by solvent extraction according to their strengths; a specific purpose is to separate such mixtures when in highly dilute aqueous solutions. It is another purpose to so control the separation that an effective fractionation is achieved between the components of such mixtures having but small differences in their dissociation constants.

The process according to the invention is based on the recognition of two solubility differentials, either or both of which may be controlling, depending upon conditions: (1) the alkali metal salts of the organic acids, or the salts of strong mineral acids with organic bases, are in general more soluble in water and less soluble in organic solvents than are the respective free organic acids or bases; and (2) the ions of the organic acids or bases are more soluble in water and less soluble in organic solvents than are the undissociated acids or bases.

The process comprises solvent extracting an aqueous solution of said mixed organic acids or organic bases in an extraction zone to form a solvent extract phase rich in the organic solvent and a residual aqueous solution, often referred to as a raffinate phase. The former is removed from the extraction zone and then scrubbed with water in a scrubbing zone, and the resulting enriched scrubbing water (containing a portion of the feed mixture) is preferably combined with said solution in the extraction zone. Scrubbed solvent extract phase and the raffinate phase are separately withdrawn from the process. Extraction and scrubbing are preferably carried out in the presence of a buffer, added to the scrubbing water or formed in the process, whose nature and concentration are such that in the first equilibrium stage from the point of entry of the scrubbing water, the pH value is between that of the feed or of the aqueous phase in the feed stage and $7\pm2$ and, preferably, $7\pm1$. This pH range may, however, also be attained without the use of buffers. Solvent may be recovered from the scrubbed extract phase or raffinate phase or both by any of the conventional methods, such as by distilling, washing out, etc.

The process may be carried out in any suitable liquid contacting apparatus, e. g., in one or several countercurrent contacting columns having perforated plates, bubble trays, packing material or other contact means therein, or in a series of mixers and settlers. A portion of this equipment may be used as the extraction zone and another portion as the scrubbing zones, and the feed mixture may be introduced at an intermediate point or stage which marks the boundary between these two zones. In this embodiment the process may be regarded as comprising a countercurrent contact zone into which organic extraction solvent is introduced continuously at the first end or stage; scrubbing water is introduced continuously at the second end or last stage and flowed countercurrently to the solvent; and the feed mixture to be split up is introduced continuously or intermittently at an intermediate point, either alone or dissolved in water. The inlet for the feed mixture may be selected as desired, preferably at the point or stage wherein the composition of the aqueous raffinate phase is nearly the same as that of the feed mixture. Either the extraction zone or the scrubbing zone or both may comprise one stage or several countercurrent contact stages.

The feed mixture may be introduced into the extraction zone alone; the aqueous solution thereof, which is extracted with the organic solvent, may, in this case, be formed within the process either as a result of transfer of enriched scrubbing water from the scrubbing zone into the extraction zone wherein it dissolves a part of the mixture (all of the water being in this case admitted first into the scrubbing zone as scrubbing water), or by admitting water, in addition to that used as scrubbing water, into the extraction zone at about the same point as the feed mixture inlet. More commonly, however, the fed mixture is introduced as an aqueous solution of the organic non-neutral electrolytes, particularly where the mixture is obtained in aqueous solution from some other industrial process. The feed mixture, whether initially free from water or in aqueous solution, may be fed into a mixer which also receives the enriched scrubbing water from the scrubbing zone and the resulting solution may then be fed into the extraction zone.

It was found that by scrubbing the solvent extract phase with scrubbing water under the pH conditions described herein, preferably in countercurrent, that a more effective separation of the component organic electrolytes can be achieved. This improvement is generally manifested by improved yield of one or both components with about the same purity or degree of separation, or by improved purity of one or both components with about the same yield, or by improved yield and purity of one or both components.

The invention will be described in greater detail with reference to the accompanying drawing forming a part of this specification, wherein:

Fig. 1 is a graph showing the hydrogen ion concentration in the extraction zone and in the scrubbing zone when applied to the separation of a mixture of organic acids, several alternate conditions being illustrated by different curves; and Fig. 2 is a schematic flow diagram illustrating one specific application of the invention.

Inasmuch as the following detailed description involves a number of physical and chemical concepts, several definitions are given below which will be helpful in considering the specification:

As was above stated, the invention is generically applicable to the separation of organic acids or bases because acids and bases are both electrolytes which have a tendency to change their number of protons, acids tending to lose and bases to acquire protons (Bell, "Acid-Base Catalysis", pp. 39 and 41, Oxford Press, 1941). The concept of acids and bases also includes non-neutral salts. In the language of Bell, page 39, "An acid is a species having a tendency to lose a proton," and page 41, "A base is a species having a tendency to add on a proton." These concepts are combined to give the definition of acids and bases as summed up in the scheme:

$$A \rightleftarrows B + H^+$$

where A is an acid and B a base. Two species related in this way are known as a corresponding (or conjugate) acid-base pair: Such pairs are $CH_3COOH$ and $CH_3COO^-$, $NH_4^+$ and $NH_3$, $H_2PO_4^-$ and $HPO_4^=$ (Bell, pp. 42 and 43). Thus acids and bases are relative terms and substances which are generally designated as either acids or bases may be designated generically as acid-base substances. For example, acetic acid is an acid in its un-ionized form since it may function as a proton donor, whereas the acetate ion is a base since it may function as a proton acceptor. Similarly the ammonium ion (including derivatives thereof such as alkyl, etc.) is a proton donor (an acid species) whereas ammonia (and derivatives thereof such as organic amines, pyridine, piperidine) are proton acceptors (base species). Since aqueous solutions of such substances contain equilibrium mixtures of the acid and base species such aqueous solutions are broadly termed acid-base solutions or solutions of acid-base substances.

Buffer substances are acids, bases or salts having finite, and especially small, dissociation constants such that their dissociation equilibrium opposes a change of pH. Substances of different pK values are required in order that they may act as buffers in different pH regions. pK value is the pH at which the dissociation of the electrolyte is 50%. For example, $NaH_2PO_4$ is a buffer in the pH region of 5 to 8. In other pH regions other buffers may be used. Thus buffers in general cover a wide range of electrolytes. In most instances, they are salts of a strong base with a weak acid or of a strong acid with a weak base.

What happens in the extraction and scrubbing system is explained below:

In order to simplify the description, be it assumed that the compounds to be separated are organic acids. In accordance with the stated preferred requirements, there shall be present a buffer substance to neutralize and to form salts of at least a portion of the acids in accordance with the equilibrium $$RH + OH^- \rightleftarrows R^- + H_2O$$

where R is an organic acid radical.

The degree of neutralization and salt formation depends on the hydrogen ion concentration (pH value) which is controlled, e. g., with the aid of a buffer, so that a portion of the acid remains in the free state. The lower the pH value, the higher the ratio of free acid to salt. Hence, lowering the pH causes a larger portion of each acid to be dissolved in the organic solvent.

The degree of salt formation is also a function of the strength of the acid, i. e., its dissociation constant, the greater the dissociation constant the higher the salt formation. As a result, when contacting the aqueous solution with a suitable organic solvent, weak acids are extracted to a greater extent than stronger ones, because a larger portion of the former than of the latter is in the free state.

The pH value also controls a second equilibrium, namely that between dissociated and undissociated acids, according to the equation $$RH \rightleftarrows R^- + H^+$$

The higher the hydrogen ion concentration (low pH, the more the dissociation is repressed. Hence, lowering the pH raises the distribution constant of organic constants between organic solvents therefor and aqueous solutions of the organic acids. This repression proceeds to a larger degree in weak acids than in stronger ones, and since the undissociated acid is preferentially soluble in the organic solvent, lowering of the pH has the effect of preferentially causing weak acids to be dissolved in the organic solvent; or vice versa, a raising of the pH value causes a preferential transfer of stronger acids from the solvent to the aqueous phase.

It will be noted that the mechanisms of separation based on both the above equilibria work in the same direction. However, in spite of this, the selectivity is frequently less than is desired.

In order to improve the selectivity between acids of different dissociation constants in accordance with this invention, the equilibrium pH of the aqueous phase at the feed inlet stage or level is so controlled that the organic solvent can extract a considerable portion of the stronger acids together with the weaker ones. This calls for a pH value of the aqueous solution at this point substantially below 7 and may require the injection of a strong inorganic acid into the extraction zone. The resulting solvent extract is then scrubbed preferably countercurrently with water having a pH between substantially neutral and that of the aqueous phase at the feed inlet stage. The water may—and in most instances should—be buffered with an alkali metal salt of a weak acid having a low distribution constant between the solvent and water, i. e., substantially below 1, so as to be dissolved predominantly in the water. Such buffering salts may be formed by adding a caustic to the scrubbing water to form a salt with the acids being extracted.

The pH of the fresh scrubbing water entering the scrubber and the pH of this water at the first equilibrium stage of the scrubber may be quite different, because the entering water absorbs some of the organic acids contained in the solvent extract. It follows that the equilibrium pH is lower than the pH of the water being admitted. The magnitude of the difference depends on the amount and strength of the acids absorbed by the water, and the nature and concentration of the buffer in the water. However, the resulting pH should not be lower than that of the original feed, or more particularly, of the aqueous solution at the stage where the original feed is admitted and, on the contrary, is normally considerably higher. As the scrubbing water flows countercurrently to the solvent extract phase, the pH of the former gradually approaches that at the feed inlet as relatively strong acids are transferred in preference to weaker ones from the solvent to the aqueous phase, where they are dissolved in the form of their alkali metal salts or as dissociated free acids, or both.

Pure water can be used for scrubbing and in some cases gives better results than buffered water, particularly if a portion of the organic acids in the feed are in the form of water-soluble salts, and furthermore if these salts are at least slightly soluble in the organic solvent. Under these circumstances, some buffer ions are supplied to the scrubbing zone from the feed over the solvent route, and advantage is taken of both solubility differentials discussed hereinbefore.

To illustrate the above, reference is had to Fig. 1 of the drawing which offers a graph of a coordinate system wherein the ordinate represents the length of an extraction column having separate extraction and scrubbing zones, and the abscissa represents the hydrogen ion concentration (log H ion) of an aqueous phase containing organic acids which are being extracted with a suitable organic solvent. On the ordinate are also indicated the points of entry and withdrawal of the several streams, i. e. water entering at the top, feed in the middle, and solvent (if lighter than water) at the bottom. The solvent extract phase is withdrawn at the top and the residual aqueous solution or raffinate phase is withdrawn at the bottom. The zone below the feed is the extraction zone, above the feed the scrubbing zone.

The H ion gradient which would accompany ideal selectivity in separating organic acids of different dissociation constants is depicted by curve 1, showing a gradual increase in the H ion concentration in a downward direction through the column, i. e., in the direction of the flow of the water. If no water scrubbing were employed, then only the portion of the curve below the feed inlet would exist, and this has a gradient of a nature illustrated by curves 2 or 2'. These two curves differ merely in the starting pH at the feed inlet which is controlled by the acidity of the incoming feed. The lower the starting pH, the more of the relatively strong feed acids are extracted by the organic solvent. As compared with the ideal, the actual H ion gradient is very unfavorable in that its natural trend is opposite from what is desired, i. e., the H ion concentration decreases rather than increases in the direction of the flow of the water. This means that at the bottom of the column where the amount of acid transferred to the solvent should be greatest, it is actually lowest; and at the feed intake where it should be low it is high.

The super-imposition of the scrubbing zone onto the extraction zone adds curve 3 which has an H ion gradient more closely resembling the ideal. By its use, at least one fault can be cured, namely that of high H ion concentration at the top of the column. By lowering this concentration at the exit of the solvent extract phase, those of the relatively strong organic acids which were dissolved in the solvent at the high H ion concentration of the aqueous phase at feed intake stage are returned to the water phase. The result is a manifold increase in selectivity of extraction between weak and strong acids.

While the above drawing illustrates the H ion gradient resulting from the extraction of organic acids, it is understood that the same principles apply to the extraction of bases. The only difference is that all gradients are reversed. Similarly, when the organic solvent is denser than water, all points and curves on Fig. 1 are inverted.

The pH of the scrubbing water at its first equilibrium stage in the scrubbing zone is between that at the feed inlet and substantially neutral. Substantially neutral is defined as having a pH value of $7\pm2$ and preferably of $7\pm1$. At the end of the scrubber away from the feed inlet (i. e., at the top in the case of Fig. 1) the pH of the water is invariably below 7 when extracting acids, and above 7 when extracting bases. Needless to say, the feed is acidic or basic, depending upon which of the two types of organic electrolytes it contains, although a portion thereof may be in the form of salts. Buffers, to be suitable, must be soluble in water and have a low distribution constant into the solvent. For the extraction of organic acids they are substantially neutral or acidic salts of alkali metals with weak acids such as bicarbonates, bisulfides, phosphates, metaphosphates, sulfites, oxalates, citrates, tartrates, etc. Buffers for the separation of bases comprise chlorides, bromides, sulfates, nitrates of ammonia, hydrazine, hydroxylamines, ethanolamines, ethylene diamines, etc. When using strongly basic "buffers" such as NaOH, KOH, etc., in the separation of weak and very weak organic acids, the salts formed between these acids and the cation of the strong base are in reality the buffers. The same holds true when using strong acids such as HCl in the separation of weak organic bases, and the salt formed between these bases and the anion of the strong acid as the buffer.

The amount of buffering substance contained in a scrubbing water may vary between wide limits, considerations being of a practical rather than critical nature. If this amount is very high and the organic acids or bases to be separated are relatively strong, then the amount extracted by the solvent may be low although the selectivity is likely to be high. On the other hand, an insufficient amount of buffering substance in the scrubbing zone may result in relatively high recovery but poor selectivity.

Solvents useful in the extraction are any liquids capable of dissolving the organic acids or bases to be separated and which are at least partially immiscible with water under the conditions of the treatment. As a rule they are substantially neutral and their solubility in water should be less than about 25% at normal room temperature.

Examples of solvents are various hydrocarbon liquids or mixtures thereof, such as propane, butanes, pentanes, hexanes, heptanes, octanes, benzene, toluene, xylenes, cumene, tetraline; gasoline, naphthas, kerosene; chlorinated hydrocarbons such as methyl chloride, chloroform, carbon tetrachloride, ethyl chloride, ethylene dichloride, trichlor ethylene, tetrachlorethane, propyl chloride; alcohols of 4 and more carbon atoms, such as n-butyl alcohol, amyl alcohol, hexyl alcohols, etc.; esters having 5 or more carbon atoms of monohydric alcohols with fatty acids, such as methyl butyrate, valerate, caproate, ethyl propionate, butyrate, valerate, propyl acetate, propionate, butyrate, valerate; butyl, amyl, etc., formates, acetates, and higher esters; aliphatic ketones of 4 or more carbon atoms, such as methyl ethyl ketone, di-ethyl ketone, methyl isopropyl ketone, di-isopropyl ketone, methyl isobutyl ketone, di-isobutyl ketone; ethers, amines, imines, etc. which are substantially water-insoluble; alkyl phenols, etc.

Solvent-to-feed ratios may vary between conventional limits which as a rule are between about 1:20 or 20:1, depending on a variety of factors. Likewise, temperatures and pressures are conventional, unless special properties, such as instability of bases or acids to be separated, impose special limitations. For example, in the separation of penicillin, temperatures as close to 0° C. as possible should be maintained to avoid deactivation of the precious drug.

To illustrate the application of the process, reference is made to Fig. 2 showing a countercurrent contact apparatus or extractor 10. The feed mixture of organic acids or bases, dissolved in water, may be introduced from line 11 into an intermediate point; the part of the extractor above the feed level forms the scrubbing zone and the part below the feed level forms the extraction zone. Scrubbing water from line 12 and, preferably, a buffer substance or caustic from line 13, are admitted through a line 14 at the end of the scrubbing zone away from the feed inlet, and an organic solvent is admitted through a line 15 at the end of the extraction zone away from the feed inlet. The organic solvent being at least partially immiscible with water, two liquid phases are formed in the extraction zone, viz., a solvent extract phase and a residual aqueous solution or raffinate phase. These flow in countercurrent one to the other, and the latter phase is withdrawn at the end of the extraction zone at 16. The solvent extract phase flows past the feed inlet into the scrubbing zone wherein it is contacted countercurrently with scrubbing water, which picks up some of the stronger acids which were carried into the scrubbing zone by the solvent. Scrubbed or final solvent extract phase is discharged at 17 and enriched scrubbing water flows from the scrubbing zone into the extraction zone, wherein it mixes with the feed mixture.

The following examples illustrate the invention:

EXAMPLE I

A sample of an aqueous penicillin solution derived from a surface culture was acidified with sulfuric acid to a pH of 2.0 and divided into two portions of equal volume.

One portion was batch extracted with chloroform and the resulting solvent extract containing the penicillin was treated with about ⅕ its volume of dilute aqueous sodium bicarbonate solution to produce an aqueous solution of the sodium salt of penicillin. This aqueous solution was evaporated under a vacuum to dryness and tested to contain penicillin in a concentration of 169 Oxford units per mg.

The other portion was batch extracted with the same amount of chloroform and the resulting solvent extract was scrubbed with about ⅕ its volume with distilled water (the reject or enriched scrubbing water from which was tested to contain about 15% of the original penicillin) before being treated with about ⅕ its volume of dilute aqueous sodium bicarbonate solution to produce an aqueous solution of the sodium salt of penicillin which was evaporated and dried as the first portion. The dry salt was tested to have a penicillin concentration of 310 Oxford units per mg. in spite of the fact that 15% of the total penicillin was lost by the additional water scrubbing step.

These comparative examples show the advantage of water washing the solvent extract containing penicillin before removing it from the solvent by treatment with dilute aqueous sodium bicarbonate solution. By returning the enriched scrubbing water to the chloroform extraction step a considerable part of the 15% of the penicillin contained therein would be recovered in the subsequent solvent extract.

EXAMPLE II

An equimolecular mixture of chloroacetic acid and propionic acid was extracted at 25° C. and at atmospheric pressure in a contact apparatus having five countercurrent stages as follows: The feed mixture of the organic acids was dissolved in water containing minor amounts of other acids and bases in such quantity that the resulting aqueous solution contained 0.100 mol of each organic acid per liter and had a pH of 5.0. This solution was continuously admitted into the third stage, and methyl isobutyl ketone, used as the organic extraction solvent, was admitted continuously into the first stage at the same volumetric flow rate as the water together with a small amount of aqueous HCl sufficient to lower the pH in the first stage to 3.25. The first three stages, therefore, formed the extraction zone wherein water and solvent flowed countercurrently. Aqueous raffinate phase was continuously withdrawn from the first stage and solvent extract phase was continuously withdrawn from the third stage.

In run 1 the solvent extract phase from the third stage was admitted to the fourth stage and scrubbing water containing NaOH was admitted continuously into the fifth stage at a volumetric rate equal to twice that of the water into the third stage and flowed countercurrently to the solvent extract phase. The NaOH content of the scrubbing water was such as to maintain the water in the fifth stage at a pH of 4.5. A two-stage scrubbing zone was thereby provided. Scrubbed extract phase was withdrawn from the fifth stage and enriched scrubbing water was transferred from the fourth stage to the third stage and therein mixed with the feed solution.

In run 2, made for comparison, the same feed mixture was extracted countercurrently in three stages as in run 1, but no acid was injected into the first stage, and the extract phase from the third stage was not scrubbed with water. Additional data, identified as runs 3 and 4, are further presented in the following table for extractions as in run 2 but using acid injection to lower the pH to the levels indicated. Recoveries reported for the solvent extract phase relate, in the case of run 1, to the scrubbed extract phase.

*Table I*

| Run No. | pH of Aqueous Phase |||||Recovery in Raffinate Phase ||Recovery in Solvent Extract Phase ||
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 3.25 | 3.55 | 3.40 | 3.8 | 4.5 | 97.7 | 20.0 | 2.3 | 80.0 |
| 2 | 4.55 | 4.05 | 3.65 | | | 78.0 | 16.0 | 22.0 | 84.0 |
| 3 | 3.8 | 3.8 | 3.8 | | | 68.3 | 34.8 | 31.7 | 65.2 |
| 4 | 3.25 | 3.25 | 3.25 | | | 29.3 | 32.4 | 70.7 | 67.7 |

NOTE: A is chloroacetic acid (the stronger acid); B is propionic acid (the weaker acid).

It is evident that by operating according to the invention (run 1) the recovery of chloroacetic acid in the raffinate phase is greatly improved without loss in purity, while the purity of propionic acid recovered in the extract phase is greatly improved without a significant reduction in yield.

EXAMPLE III

As a further example of the separation of organic acids, an equi-molecular mixture of benzoic acid and o-hydroxybenzoic acid was extracted in two runs in the manner described for runs 1 and 2, respectively, in the previous example, with the difference that the feed mixture was dissolved in water to produce a solution containing 0.050 mol of each acid per liter with a pH of 5.0, and that the amount of acid and caustic injected into the first and fifth stages in run 1 were such as to cause the aqueous phase to have the pH values indicated in Table II. Additional data, identified as run 3, is further presented to show the effect of injecting acid for an extraction as in run 2 to maintain a pH similar to that of run 1. The conditions and recoveries are:

*Table II*

| Run No. | pH of Aqueous Phase |||||Recovery in Raffinate Phase ||Recovery in Solvent Extract Phase ||
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 5.0 | 5.7 | 5.7 | 5.48 | 6.0 | 92.3 | 22.9 | 7.7 | 77.1 |
| 2 | 7.6 | 7.55 | 6.95 | | | 99.3 | 92.8 | 0.72 | 7.2 |
| 3 | 6.0 | 6.0 | 6.0 | | | 85.0 | 16.9 | 15.0 | 83.1 |

NOTE: A is o-hydroxybenzoic acid (the stronger acid); B is benzoic acid (the weaker acid).

These data show improved separation in the case of run 1. The purities of o-hydroxybenzoic acid in the raffinates were 80, 51.7 and 83.4 mol percent, respectively, and of the benzoic acid in the corresponding extracts were 90.8, 91.0 and 84.7 mol percent.

EXAMPLE IV

To demonstrate the application of the process to the separation of organic bases, a mixture of aniline and methylcyclohexylamine was extracted in two runs under the conditions of Example II in the same apparatus. In each run the mixture was dissolved in water containing minor amounts of other acids and bases in such quantity that the resulting aqueous solution contained 0.0505 mol of aniline and 0.0489 mol of methylcyclohexylamine per liter and had a pH of 11.4. This solution was admitted continuously into the third stage, and methylisobutyl ketone, used as the organic extraction solvent, was admitted continuously into the first stage at the same volumetric rate as the water and flowed countercurrently thereto. Aqueous raffinate was continuously withdrawn from the first stage and solvent extract phase was continuously withdrawn from the third stage.

In run 1 the solvent extract phase from the third stage was admitted into the fourth stage and scrubbed countercurrently with scrubbing water containing a small amount of HCl admitted into the fifth stage, the HCl content being such as to lower the pH of the aqueous phase in the fifth stage to 7.0. Scrubbed extract phase was withdrawn from the fifth stage and the enriched scrubbing water from the fourth stage was transferred to the third stage and therein mixed with the feed solution.

In run 2 the extract phase from the third stage was withdrawn from the process and no scrubbing was used.

Conditions and results were as follows:

*Table III*

| Run No. | pH of Aqueous Phase |||||Recovery in Raffinate Phase ||Recovery in Solvent Extract Phase ||
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 9.1 | 9.9 | 10.4 | 10.0 | 7.0 | 93.6 | 3.3 | 6.4 | 96.7 |
| 2 | 10.4 | 10.9 | 11.3 | | | 8.5 | 3.1 | 91.5 | 96.9 |

NOTE: A is methylcyclohexylamine (the stronger base); B is aniline (the weaker base).

The data show a remarkable improvement in the purities of both products, and a great improvement in the recovery of the stronger base in the raffinate.

EXAMPLE V

To show the effect of using scrubbing water without buffer as applied to the separation of bases, an equi-molecular mixture of pyridine and methylcyclohexylamine is dissolved in water as in the previous examples to form an aqueous solution containing 0.050 mol of each base per liter and extracted in two runs in the manner described for Example IV, except that in run 1 a small amount of NaOH is injected into the first stage to raise the pH therein to 9.0. Additional data, identified as run 3, is presented to show the effect of injecting NaOH in an extraction without scrubbing (corresponding to run 2) to raise the pH to the levels indicated. Conditions and results are as shown in Table IV.

TABLE IV

| Run No. | pH of Aqueous Phase | | | | | Recovery in Raffinate Phase | | Recovery in Solvent Extract Phase | |
|---|---|---|---|---|---|---|---|---|---|
| | Stage 1 | Stage 2 | Stage 3 | Stage 4 | Stage 5 | A | B | A | B |
| | | | | | | Per cent | Per cent | Per cent | Per cent |
| 1 | 9.0 | 9.0 | 9.0 | 8.0 | 7.0 | 100.0 | 5.0 | 0.0 | 95.0 |
| 2 | 7.0 | 8.0 | 9.0 | | | 89.0 | 4.0 | 11.0 | 96.0 |
| 3 | 9.0 | 9.0 | 9.0 | | | 89.3 | 3.8 | 10.7 | 96.2 |

NOTE.—A is methylcyclohexylamine (the stronger base); B is pyridine (the weaker base).

This application is a continuation-in-part of my copending application Serial No. 540,960, filed June 19, 1944 which was subsequently abandoned.

I claim as my invention:

1. Process for separating a mixture of organic water-soluble electrolytes having a tendency to change their number of protons in the same direction when dissolved in water, said electrolytes having different dissociation constants, into fractions containing said electrolytes in different proportions comprising the steps of contacting said mixture in an extraction zone in aqueous solution with an organic, at least partially water-immiscible solvent for said organic electrolytes to produce an aqueous phase and a solvent extract phase rich in the organic solvent; separating said phases; contacting the separated extract phase with scrubbing water at a pH between about $7 \pm 2$ and that of the aqueous phase in the extraction zone to produce a scrubbed extract phase and an enriched water phase; separating the latter phases; and introducing said separated enriched water phase into the extraction zone.

2. Process for separating a mixture of organic water-soluble acids having different dissociation constants into fractions containing said acids in different proportions comprising the steps of contacting said mixture in an extraction zone with an organic, at least partially water-immiscible solvent for said organic acids under conditions to produce an aqueous phase having a pH substantially below 7.0 and a solvent extract phase rich in the organic solvent in equilibrium therewith; separating said phases; contacting the separated extract phase with scrubbing water at a pH between about 9 and that of said aqueous phase to produce a scrubbed extract phase and an enriched water phase; separating the latter phases; and introducing said separated enriched water phase into the extraction zone.

3. Process for separating a mixture of organic water-soluble bases having different dissociation constants into fractions containing said bases in different proportions comprising the steps of contacting said mixture in an extraction zone with an organic, at least partially water-immiscible solvent for said organic bases under conditions to produce an aqueous phase having a pH substantially above 7.0 and a solvent extract phase rich in the organic solven in equilibrium therewith; separating said phases; contacting the separated extract phase with scrubbing water at a pH between about 5 and that of said aqueous phase to produce a scrubbed extract phase and an enriched water phase; separating the latter phases; and introducing said separated enriched water phase into the extraction zone.

4. Process for separating a mixture of organic water-soluble electrolytes having a tendency to change their number of protons in the same direction when dissolved in water, said electrolytes having different dissociation constants, into fractions containing said electrolytes in different proportions comprising the steps of contacting said mixture in an extraction zone in aqueous solution with an organic, at least partially water-immiscible solvent for said organic electrolytes to produce an aqueous phase and a solvent extract phase rich in the organic solvent; separating said phases; contacting the separated extract phase in a scrubbing zone with scrubbing water containing a buffer in concentration to have a pH in the scrubbing zone between about $7 \pm 2$ and that of the aqueous phase in the extraction zone to produce a scrubbed extract phase and an enriched water phase; separating the latter phases; and introducing said separated enriched water phase into the extraction zone.

5. Process for separating a mixture of organic water-soluble electrolytes having a tendency to change their number of protons in the same direction when dissolved in water, said electrolytes having different dissociation constants, into fractions containing said electrolytes in different proportions comprising the steps of contacting said mixture in an extraction zone in aqueous solution with an organic, at least partially water-immiscible solvent for said organic electrolytes to produce an aqueous phase and a solvent extract phase rich in the organic solvent; separating said phases; contacting the separated extract phase in a counter-current scrubbing zone with scrubbing water at a pH which is between about $7 \pm 2$ and that of the aqueous phase in the extraction zone; separating the latter phases; and introducing said separated enriched water phase into the extraction zone.

6. The process according to claim 5 wherein said organic electrolytes are acids.

7. The process according to claim 5 wherein said organic electrolytes are bases.

8. Process for separating a mixture of organic water-soluble electrolytes having a tendency to change their number of protons in the same direction when dissolved in water from an aqueous solution thereof, said electrolytes having different dissociation constants, into fractions containing said electrolytes in different proportions comprising the steps of flowing said aqueous solution of the mixture in combination with enriched scrubbing water produced in the process through an extraction zone counter-currently to an at least partially water-immiscible organic solvent for said electrolytes to form counter-flowing aqueous raffinate and solvent extract phases, the latter phase being rich in said organic solvent; separating said raffinate and solvent extract phases and withdrawing them from opposite ends of said extraction zone; introducing said separated solvent extract phase into one end of a scrubbing zone; admitting scrubbing water into the other end of said scrubbing zone to result in a pH which is between that of the original aqueous solution of the mixture and that of pure water; countercurrently washing said extract phase with said scrubbing water to produce a scrubbed solvent extract phase and an enriched scrubbing water phase; separately removing the latter phases from the scrubbing zone; and combining said enriched scrubbing water phase with said aqueous solution of the mixture for flow therewith through said extraction zone.

9. The process according to claim 8 wherein the enriched scrubbing water is introduced into said extraction zone separately from said aqueous feed mixture and is combined therewith within the extraction zone.

10. Process for separating a mixture of organic water-soluble electrolytes having a tendency to change their number of protons in the same direction when dissolved in water, said electrolytes having different dissociation constants, into fractions containing said electrolytes in different proportions comprising the steps of introducing a partially water-immiscible organic solvent for said organic electrolytes into one end of a countercurrent treating zone; introducing substantially neutral water at the other end; admitting said mixture of organic electrolytes at a point intermediate said ends; flowing the resulting solvent extract phase and aqueous raffinate phase countercurrently to each other through said treating zone; and withdrawing said phases at the ends of said treating zone opposite the respective ends of introduction of the solvent and the water, respectively.

11. The process according to claim 10 wherein the feed mixture is introduced into said treating zone as an aqueous solution.

12. Process for separating a mixture of organic water-soluble electrolytes having a tendency to change their number of protons in the same direction when dissolved in water, said electrolytes having different dissociation constants, into fractions containing said electrolytes in different proportions comprising the steps of introducing an at least partially water-immiscible organic solvent for said organic electrolytes into one end of a countercurrent treating zone; introducing water at the other end; admitting said mixture of organic electrolytes at a point intermediate said ends; flowing the resulting solvent extract phase and aqueous raffinate phase countercurrently to each other through said treating zone; withdrawing said phases at the ends of the treating zone opposite the ends of introduction of the solvent and water, respectively; and maintaining the pH of the water which is in contact with the solvent extract phase near the point of withdrawal of the latter at a value beween $7+2$ and the pH of the aqueous raffinate phase at the point of introduction of the said mixture into the treating zone.

13. Process for separating a mixture of organic water-soluble acids from an aqueous solution thereof having a pH substantially below 7, into fractions containing said acids in different proportions comprising the steps of introducing a partially water-immiscible organic solvent for said acids at one end and water at the other end of a countercurrent treating zone; introducing said aqueous solution at a point intermediate both ends; flowing the resulting solvent extract phase and aqueous raffinate phase countercurrently to each other through said treating zone; removing solvent extract phase and aqueous raffinate phase from said zone at ends opposite the points of introduction of the solvent and the water, respectively; and maintaining the pH of the water near the end of the zone where the water is introduced at a value below 7 and above that of the original aqueous solution.

14. Process for separating a mixture of organic water-soluble bases from an aqueous solution thereof having a pH substantially above 7, into fractions containing said bases in different proportions comprising the steps of introducing a partially water-immiscible organic solvent for said acids at one end and water at the other end of a countercurrent treating zone; introducing said aqueous solution at a point intermediate both ends; flowing the resulting solvent extract phase and aqueous raffinate phase in countercurrent to each other through said treating zone; removing solvent extract phase and aqueous raffinate phase from said zone at ends opposite the points of introduction of the solvent and the water, respectively; and maintaining the pH of the water near the end of the zone where the water is introduced at a value above 7 and below that of the original aqueous solution.

15. Process for separating penicillin from an aqueous acidic solution containing it together with organic acids having different dissociation constants, comprising the steps of flowing said solution in combination with enriched scrubbing water produced in the process through an extraction zone countercurrently to a partially water-immiscible organic solvent for said penicillin and organic acids; separating the resulting solvent extract phase and residual aqueous raffinate phase from opposite ends of said zone; introducing said solvent extract phase into one end of a scrubbing zone; admitting scrubbing water into the other end of the scrubbing zone to result in a pH which is between that of said original solution and that of pure water; countercurrently scrubbing said extract phase with said scrubbing water; separately removing the resulting scrubbed solvent extract phase and the enriched scrubbing water from the scrubbing zone; and combining said enriched scrubbing water with said aqueous solution for flow therewith through said extraction zone.

16. Process of separating penicillin from an aqueous acidic solution containing it together with organic acids having different dissociation constants, comprising the steps of contacting said acidic aqueous solution with an organic solvent for penicillin having a solubility in water at normal room temperature less than about 25% to produce an aqueous raffinate phase and a solvent extract phase rich in said organic solvent; separating said phases; scrubbing said separated solvent extract phase in a scrubbing zone with scrubbing water to produce an enriched aqueous phase in equilibrium with said solvent extract phase, the pH of the water being such that the said enriched aqueous phase has a pH between that of the original aqueous solution and that of substantially neutral water.

MOTT SOUDERS, JR.

REFERENCES CITED

The following references are of record in the file of this patent:

UNITED STATES PATENTS

| Number | Name | Date |
|---|---|---|
| 1,917,660 | Martin et al. | July 11, 1933 |
| 2,081,719 | von Dijck et al. | May 25, 1937 |
| 2,081,721 | von Dijck et al. | May 25, 1937 |
| 2,184,928 | Luten et al. | Dec. 29, 1939 |
| 2,218,139 | Thomas | Oct. 15, 1940 |
| 2,288,281 | Huijser et al. | June 30, 1942 |
| 2,362,579 | Murray et al. | Nov. 14, 1944 |